United States Patent [19]

Kurakake

[11] Patent Number: 5,900,564
[45] Date of Patent: May 4, 1999

[54] MUSIC DATA PROCESSING APPARATUS WITH COMMUNICATION INTERFACE AND GRAPHIC USER INTERFACE

[75] Inventor: Yasushi Kurakake, Hamamatsu, Japan

[73] Assignee: Yamaha Corporation, Hamamatsu, Japan

[21] Appl. No.: 08/946,045

[22] Filed: Oct. 7, 1997

[30] Foreign Application Priority Data

Oct. 19, 1996 [JP] Japan .................................... 8-297225

[51] Int. Cl.⁶ ................................................. G09B 15/02
[52] U.S. Cl. ...................... 84/477 R; 84/601; 434/307 A
[58] Field of Search .......................... 84/600, 601, 477 R; 434/307 A

[56] References Cited

U.S. PATENT DOCUMENTS 5,563,359  10/1996  Okamura .
5,616,876   4/1997  Cluts .................................... 434/307 A
5,654,516   8/1997  Tashiro et al. ............................ 84/601
5,735,744   4/1998  Okamoto ......................... 434/307 A X

FOREIGN PATENT DOCUMENTS 62-129889  6/1987  Japan .

Primary Examiner—David Martin
Assistant Examiner—Jeffrey W. Donels
Attorney, Agent, or Firm—Graham & James LLP

[57] ABSTRACT

A terminal apparatus is connectable to a host station and is responsive to a command to execute an application program to treat music data. In the terminal apparatus, a local storage locally stores an old version of software containing music data and various application programs which are selectively executed to treat the music data. An interface is optionally activated prior to execution of an application program for communication with the host station having a remote storage which remotely stores a new version of software including music data and various application programs which are made available latest by the host station. A controller operates when the interface establishes the communication with the host station for downloading the new version from the remote storage of the host station and for transferring the downloaded new version to the local storage so as to renew the old version stocked in the local storage by the new version. A processor responds to the command for selectively executing the various application programs to treat the music data based on the new version when the interface has been activated and otherwise for selectively executing the various application programs to treat the music data based on the old version when the interface has not been activated. A display graphically presents a map containing various objects corresponding to the various application programs. A pointing tool is manipulated for pointing one of the various objects on the display so as to select one of the various application programs corresponding to the pointed object to thereby input the command.

20 Claims, 10 Drawing Sheets

MUSIC DATA PROCESSING APPARATUS WITH COMMUNICATION INTERFACE AND GRAPHIC USER INTERFACE

BACKGROUND OF THE INVENTION

The present invention generally relates to a music data processing apparatus for processing music data, in which application programs and music data are distributed in a local storage such as a hard disk and a CD-ROM and in a remote storage of a host computer of a network.

A so-called communication karaoke is known as a system for transferring music data over a network. In this system, music data prepared by a host computer is distributed to communication karaoke apparatuses or terminal devices over a communication network. On the other hand, a music training apparatus or the like is constructed as a stand-alone type, in which a CD-ROM (Compact Disk-ROM) drive is connected to an electronic musical instrument and necessary programs and data are stored on a CD-ROM which is loaded into the CD-ROM drive. These programs and data are read from the CD-ROM and the read programs and data are executed or processed for implementing various music training operations using music data. Further, in the field of personal computer communication, an on line service has recently come to be offered in which a map of streets or a town for example is graphically displayed on a video display terminal and the user can virtually trace the map to visit a desired site of the displayed streets or town.

However, the above-mentioned communication karaoke system is restricted in capability only to distribution of music data to local terminals through the network. The above-mentioned music training apparatus of the stand-alone type with a CD-ROM drive connected to an electronic musical instrument is restricted in capability only to use of programs and data stored in a CD-ROM. The above-mentioned virtual system realized on a personal computer network in which the user can walk about displayed streets or town merely uses such a displayed map as a user interface and hence can do nothing more than that.

SUMMARY OF THE INVENTION

It is therefore an object of the present invention to provide a music data processing apparatus for processing music data in a variety of ways by use of local information stored in a local storage such as a hard disk and a CD-ROM and remote information stored in a remote storage of a network. It is another object of the present invention to provide a music data processing apparatus that allows easy addition of new capabilities and easy upgrading of programs.

According to one aspect of the invention, a terminal apparatus is connectable to a host station and is responsive to a command to execute an application program to treat music data. In the inventive terminal apparatus, a local storage locally stores an old version of software containing music data and various application programs which are selectively executed to treat the music data. An interface is optionally activated prior to execution of an application program for communication with the host station having a remote storage which remotely stores a new version of software including music data and various application programs which are made available latest by the host station. A controller operates when the interface establishes the communication with the host station for downloading the new version from the remote storage of the host station and for transferring the downloaded new version to the local storage so as to renew the old version stocked in the local storage by the new version. A processor responds to the command for selectively executing the various application programs to treat the music data based on the new version when the interface has been activated and otherwise for selectively executing the various application programs to treat the music data based on the old version when the interface has not been activated. Preferably, the terminal apparatus further comprises a display that graphically presents a map containing various objects corresponding to the various application programs, and a pointing tool that is manipulated for pointing one of the various objects on the display so as to select one of the various application programs corresponding to the pointed object to thereby input the command.

According to another aspect of the invention, a terminal apparatus is connectable to a host station for transacting music contents. In the inventive terminal apparatus, a local storage is provided for locally storing the music contents. A production section is operated to produce an item of the music contents which is stored in the local storage for later distribution. A reproduction section is operated to reproduce the music contents stored in the local storage. An interface is activated for communicating with the host station having a remote storage which remotely stores the music contents for distribution. An uploader uploads the produced item of the music contents from the local storage to the remote storage through the interface for distributing the produced item of the music contents. A downloaded downloads another item of the music contents from the remote storage to the local storage through the interface for collecting the music contents. Preferably, the interface comprises a graphic user interface including a display for graphically presenting a virtual shop so that the uploader and the downloaded transact the music contents through the virtual shop.

According to a further aspect of the invention, a multimedia apparatus comprises a storage that stores music information and picture information. A display graphically presents a map of a virtual town according to the picture information stored in the storage. The map contains a plurality of sites which are linked to provide a plurality of services associated to the music information stored in the storage. A pointing tool is manipulated for tracing the map on the display to address a site so as to specify a service allotted to the addressed site. A processor operates when the site is addressed by the pointing tool for processing the music information stored in the storage so as to provide the specified service. Preferably, the inventive multimedia apparatus further comprises an interface that is activated for communicating with a host station having a remote storage which remotely stores a new version of the music information and the picture information, which are made available latest by the host station, and a controller that operates when the interface communicates with the host station for downloading the new version from the remote storage of the host station and for transferring the downloaded new version to the storage so as to renew an old version of the music information and the picture information stored in the storage by the new version.

BRIEF DESCRIPTION OF THE DRAWINGS

The invention disclosed herein will be understood better with reference to the following drawings of which.

DETAILED DESCRIPTION OF PREFERRED EMBODIMENTS

Figure 1:
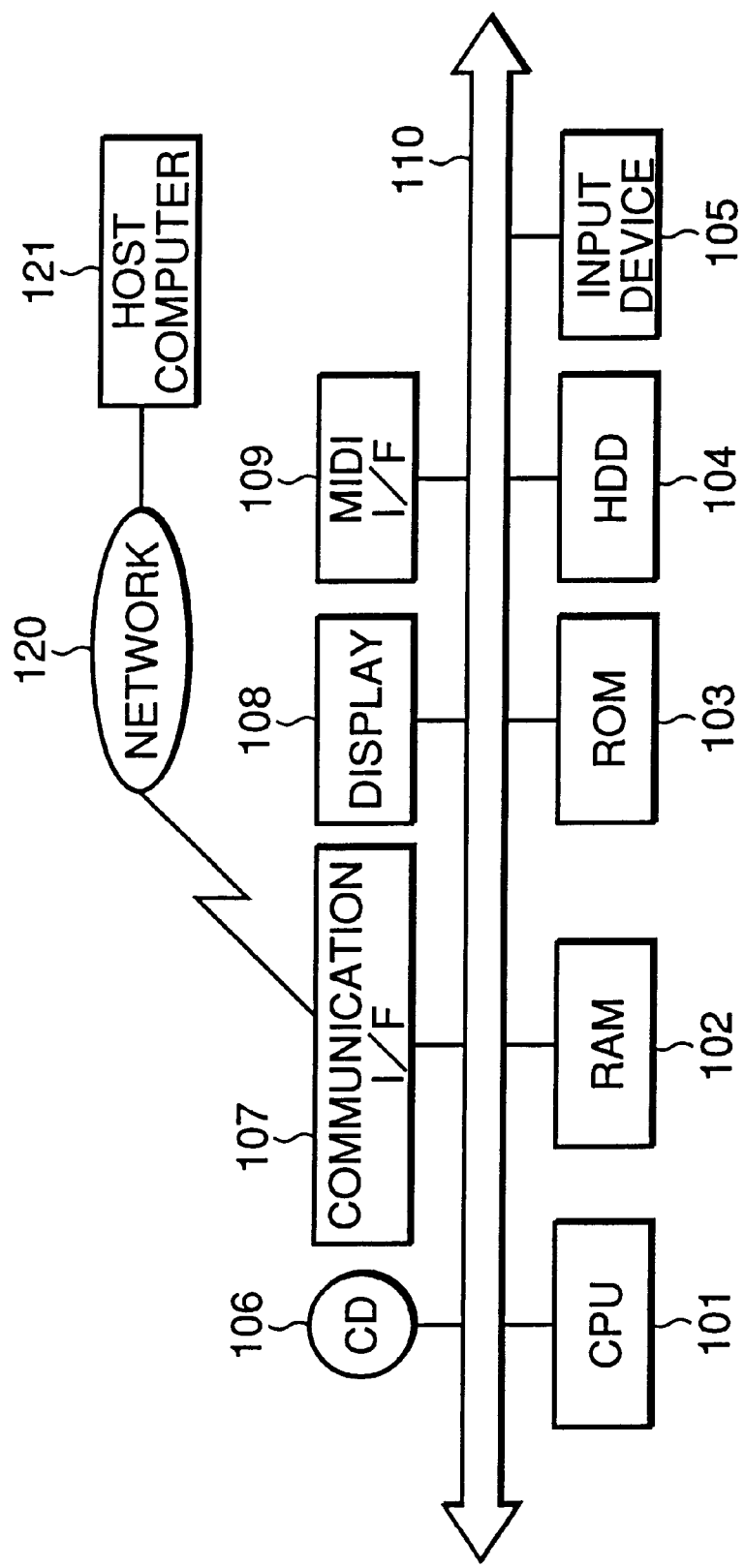
FIG. 1 is a block diagram illustrating an overall constitution of a music data processing apparatus associated with the present invention.

This invention will be described in further detail by way of example with reference to the accompanying drawings. FIG. 1 shows a block diagram illustrating an overall constitution of a music data processing apparatus associated with the present invention. This music data processing apparatus has a central processing unit (CPU) 101, a random access memory (RAM) 102, a read-only memory (ROM) 103, a hard disk drive (HDD) 104, an input device 105, a CD-ROM drive 106, a communication interface (I/F) 107, a display 108, a MIDI (Musical Instrument Digital Interface) 109, and a bus line 110.

The CPU 101 controls the overall operation of this terminal apparatus. The RAM 102 provides a main memory for use as a work area of the CPU 101. The ROM 103 stores a power-on sequence start-up routine program and a BIOS (Basic Input/Output System) for controlling low-level I/O processing. The HDD 104 is a local storage device of this music data processing apparatus. The HDD 104 stores picture data for display, music data including music performance data, and application programs for processing or treating the music data. These data and programs have been installed from the CD-ROM drive 106 to the HDD 104. A desired one of the application programs for music data processing is loaded by the user into the RAM 102 to be executed by the CPU 101. Thus, various processing operations are performed on the music data. The input device 105 includes a keyboard and a pointing tool such as a mouse tool connected to an ordinary personal computer. The CD-ROM drive 106, in which a removable CD-ROM is loaded, reads programs and music data from the CD-ROM. The CD-ROM may be used as a machine readable medium in the music data processing apparatus including the CPU 101. The machine readable medium may contain program instructions executable by the CPU 101 for causing the inventive apparatus to perform desired steps of music data processing operation.

The communication interface 107 connects this music data processing apparatus to a network 120. The music data processing apparatus is connected to a host station in the form of a host computer 121 through the network 120 to download programs and data from a remote storage of the host computer 121. The display 108 is an output device on which various pieces of graphics and picture information are displayed. The MIDI interface 109 connects this music data processing apparatus to external MIDI devices. The above-mentioned components 101 through 109 are interconnected by the two-way bus line 110. It should be noted that the apparatus shown in FIG. 1 is implemented by installing a CD-ROM drive, a communication interface, a MIDI interface, and necessary software on a general-purpose personal computer.

According to one aspect of the invention, the terminal apparatus shown in FIG. 1 is connectable to a host station in the form of the host computer 121 and is responsive to a command to execute an application program to treat music data. In the inventive terminal apparatus, a local storage in the form of the HDD 104 or other storage locally stores an old version of software containing music data and various application programs which are selectively executed to treat the music data. The communication interface 107 is optionally activated prior to execution of an application program for communication with the host computer 121 having a remote storage which remotely stores a new version of software including music data and various application programs which are most recently made available latest by the host computer 121. A controller in the form of the CPU 101 operates when the interface 107 establishes the communication with the host computer 121 for downloading the new version from the remote storage of the host computer 121 and for transferring the downloaded new version to the local storage composed of the HDD 104 so as to renew the old version stocked in the local storage by the new version. A processor also in the form of the CPU 101 responds to the command for selectively executing the various application programs to treat the music data based on the new version when the interface 107 has been activated and otherwise for selectively executing the various application programs to treat the music data based on the old version when the interface 107 has not been activated. Preferably, the terminal apparatus further comprises the display 108 that graphically presents a map containing various objects corresponding to the various application programs, and a pointing tool or the input device 105 that is manipulated for pointing one of the various objects on the display 108 so as to select one of the various application programs corresponding to the pointed object to thereby input the command.

According to another aspect of the invention, the terminal apparatus shown in FIG. 1 is connectable to the host station for transacting music contents. In the inventive terminal apparatus, the local storage is provided in the form of the HDD 104 or the CD-ROM drive 106 for locally storing the music contents. A production section or module is operated by the CPU 101 to produce an item of the music contents which is stored in the local storage for later distribution. A reproduction section is operated by the CPU 101 to reproduce the music contents stored in the local storage. The communication interface 107 is activated for communicating with the host station having a remote storage which remotely stores the music contents for distribution. An uploader uploads the produced item of the music contents from the local storage to the remote storage through the interface 107 for distributing the produced item of the music contents to the network 120. A downloaded downloads another item of the music contents from the remote storage to the local storage through the interface 107 for collecting the music contents from the network 120. Preferably, the interface 107 comprises a graphic user interface including the display 108 for graphically presenting a virtual shop so that the uploader and the downloaded transact the music contents through the virtual shop.

According to a further aspect of the invention, the multimedia apparatus shown in FIG. 1 comprises a storage such as the HDD 104 that stores music information and picture information. The display 108 graphically presents a map of a virtual town according to the picture information stored in the storage. The map contains a plurality of sites which are linked to provide a plurality of services associated to the music information stored in the storage. A pointing tool or the input device 105 is manipulated for tracing the map on the display 108 to address a site so as to specify a service allotted to the addressed site. A processor in the form of the CPU 101 operates when the site is addressed by the pointing tool for processing the music information stored in the storage so as to provide the specified service. Preferably, the inventive multimedia apparatus further comprises the communication interface 107 that is activated for communicating with the host computer 121 having a remote storage which remotely stores a new version of the music information and the picture information, which are made available latest by the host computer 121, and a controller also in the form of the CPU 101 that operates when the interface 107 communicates with the host computer 121 for downloading the new version from the remote storage of the host computer 121 and for transferring the downloaded new version to the storage composed of the HDD 104 so as to renew an old version of the music information and the picture information stored in the storage by the new version.

Figure 2:
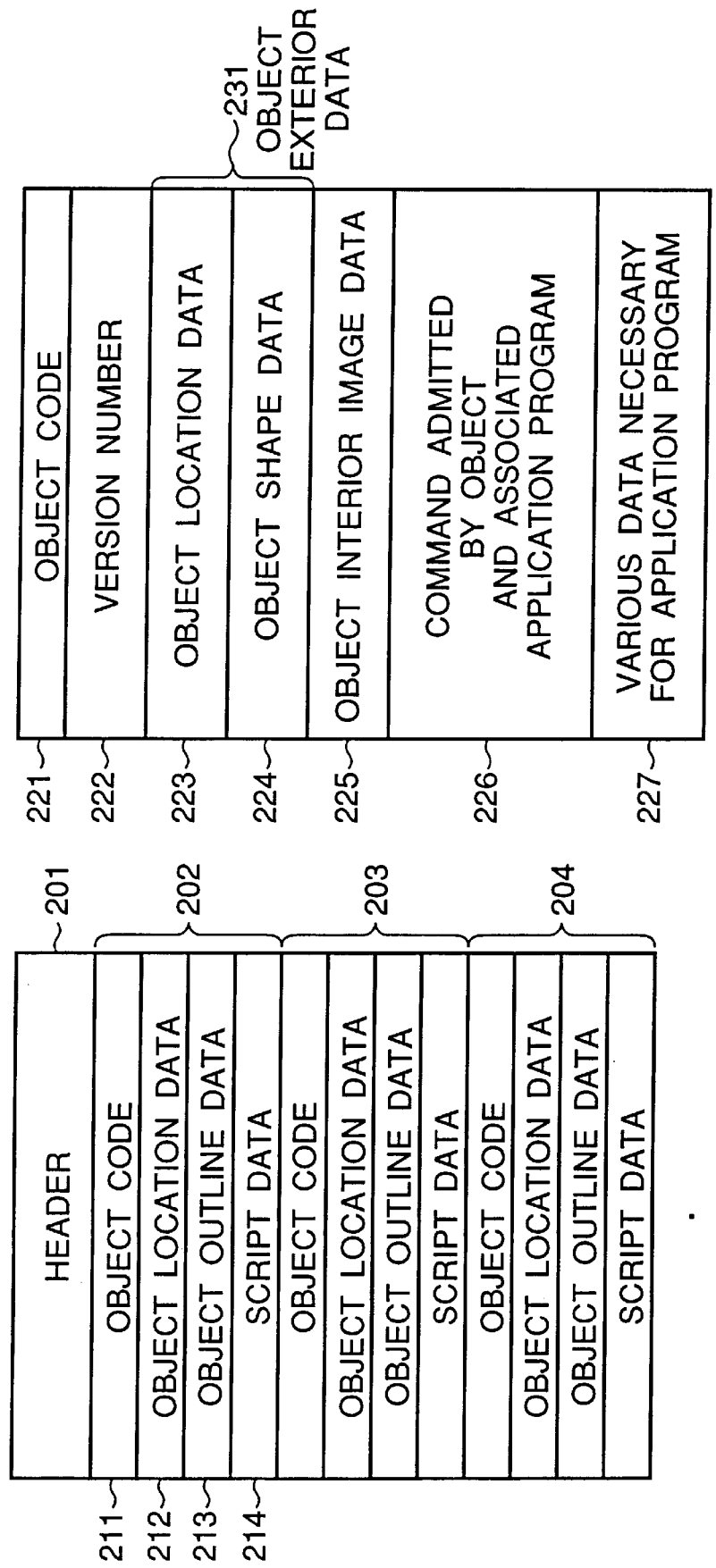
FIGS. 2(a) and 2(b) are a diagram illustrating structure of graphic data representing an object such as a building necessary for displaying a map of town sight.

As mentioned above, this inventive music data processing apparatus displays a sight of a town on the display 108 as a virtual reality. By manipulating the input device 105 such as a mouse tool, the user can get an image as if he or she walks about in the displayed sight. FIGS. 2(*a*) and 2(*b*) show picture data structure representing objects such as buildings necessary for displaying a sight of a town. FIG. 2(*a*) shows the structure of object index data. FIG. 2(*b*) shows the structure of object content data. These two pieces of data are stored in the HDD 104.

The object index data shown in FIG. 2(*a*) is composed of a header part 201 and a plurality of index data parts 202, 203, 204 and so on. The header part 201 records the size of this object index data and the number of index data parts. Each index data part represents index information about one object. Consequently, the number of index data parts denotes a total number of objects such as buildings arranged in a map of the sight.

The following describes the structure of one index data part exemplified by the first index data part 202. The index data part 202 is composed of object code 211, object location data 212, object outline data 213, and script data 214. The object code 211 is a number unique to this building. The object location data 212 denotes a location at which this building is located in the sight of a town. The object outline data 213 denotes an outline of this building arranged in the sight. The script data 214 is explanatory data for describing which processing or service is to be performed when the name of this building or the building itself is pointed and clicked with the mouse tool. Namely, the various objects are linked to various services. A desired object may be designated to specify a corresponding service which is provided by executing an appropriate application program. Each of the index data parts 203, 204, and so on has the same structure as that of the index data part 202. These index data parts are collected by the number equal to the number of buildings in the sight, and the header part 201 is combined to the collected index data parts to form the entire object index data.

The object content data shown in FIG. 2(*b*) denotes various pieces of detailed information about one building. This object content data is provided for each of the buildings in the sight. The object content data is composed of an object code 221, a version number 222, object location data 223, shape data 224, object interior image data 225, an application program corresponding to a command admitted when the object is addressed, and various pieces of data 227 necessary for execution of the application program.

The object code 221 is a number unique to this building. This object code 221 corresponds to the object code 211 shown in FIG. 2(*a*). That is, if the object code 211 is the same as the object code 221 in number, the index data part and the object content data are coupled to each other to graphically present the building. The version number 222 is information representing a version of this building. The object location data 223 denotes the detailed location or site of this building in the sight. The shape data 224 denotes detailed shape of this building in the sight. The term "detailed" denotes "more detailed" than the object location data 212 and the object outline data 213 of the index data part of this building. The object location data 223 and the shape data 224 are generically called object exterior data 231. The object interior image data 225 indicates an interior image of this building to be displayed when the user issues a command to enter this building. The application program 226 is commenced in response to the command which is virtually admitted in the building when user manipulates the mouse tool inside the building. The various pieces of data 227 are necessary for execution of the application program 226.

Figure 3:
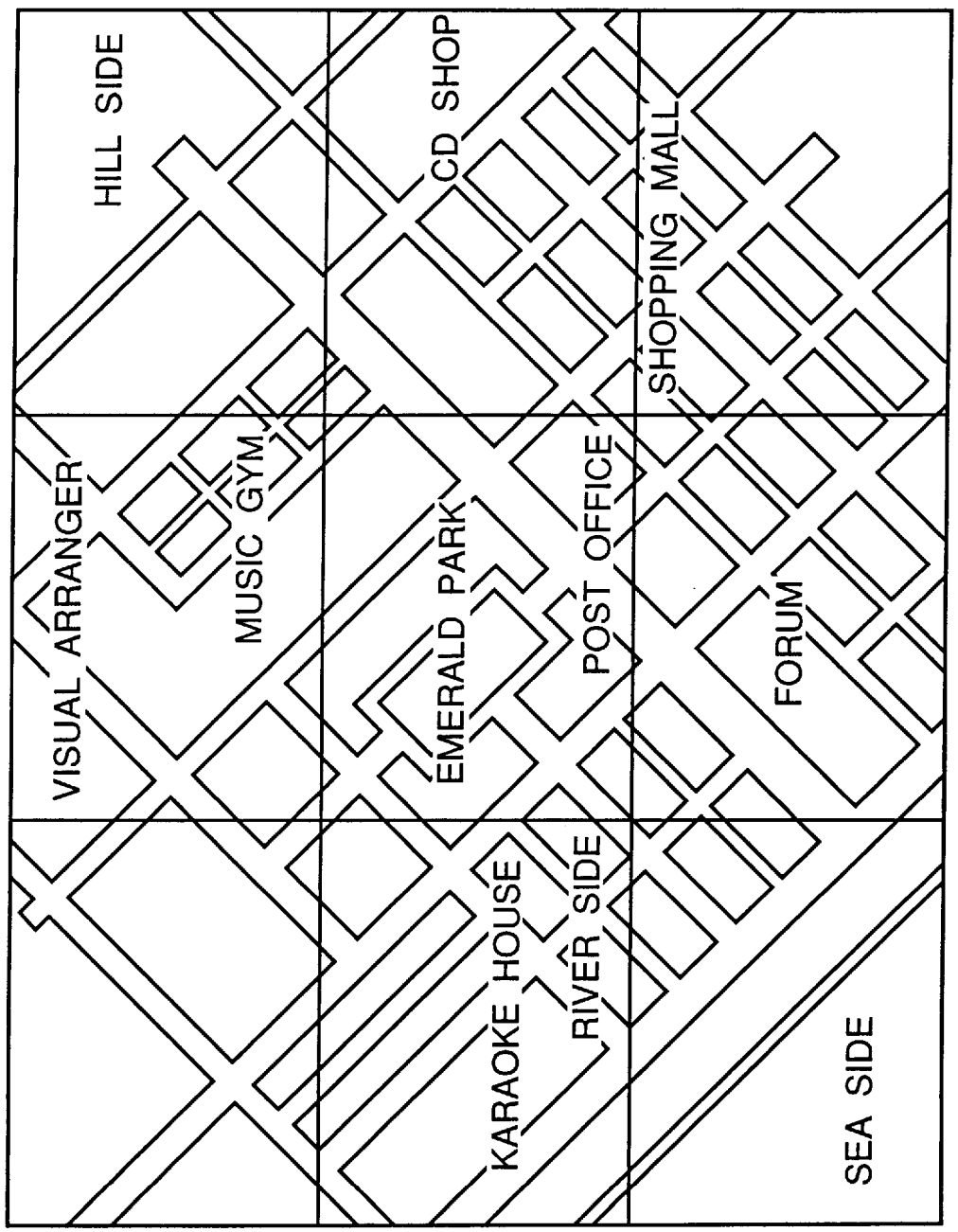
FIG. 3 is a diagram illustrating an example of a two-dimensional map of town sight.
Figure 4:
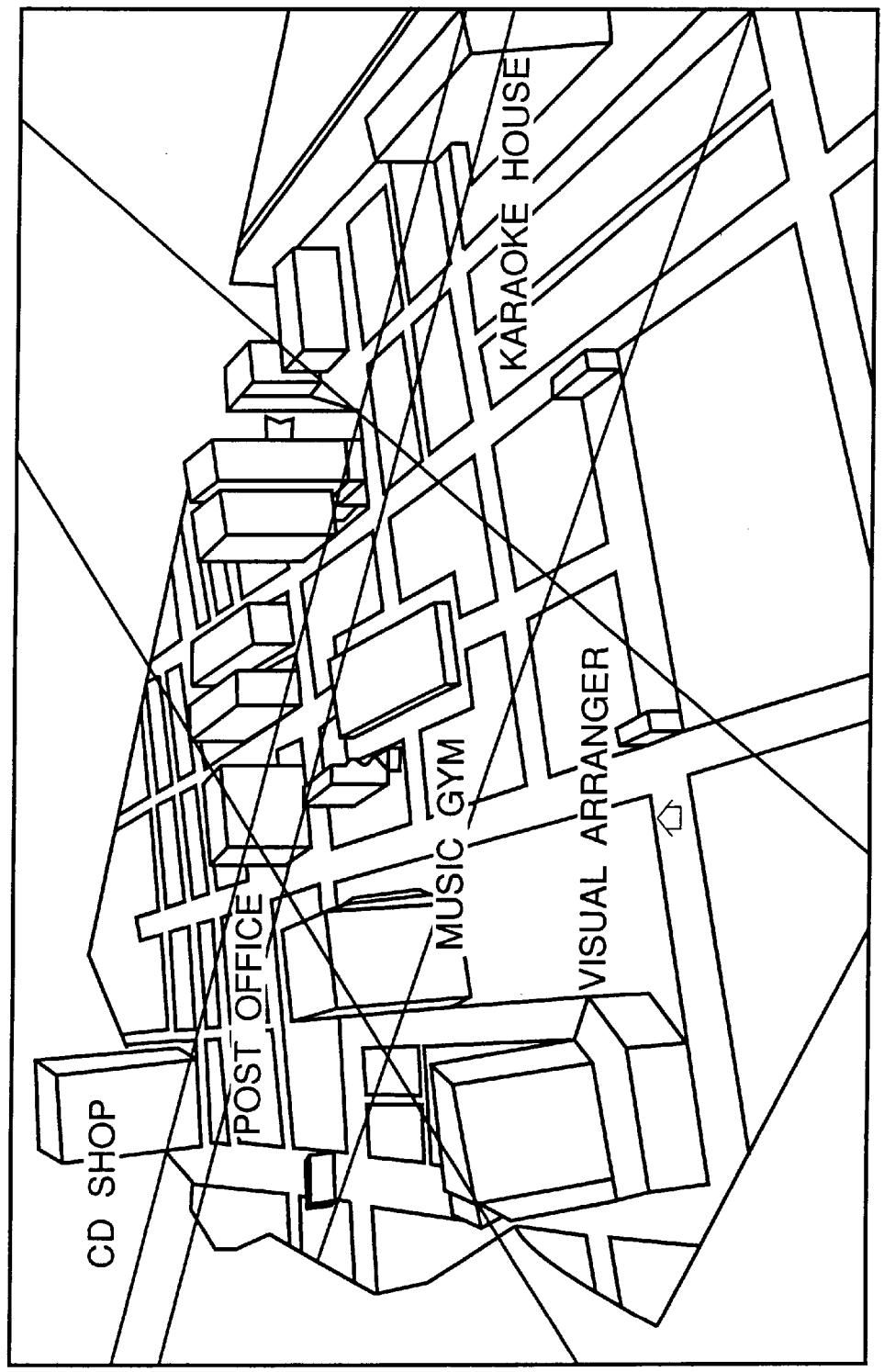
FIG. 4 is a diagram illustrating an example of a three-dimensional map of town sight.

FIGS. 3 and 4 are examples of a sight graphically presented on the display 108 when the music data processing program stored in the HDD 104 is started as a main application program in the apparatus shown in FIG. 1. shows the sight of a town in a two-dimensional map. FIG. 4 shows the same sight of FIG. 3 in a three-dimensional map. The user can switch between the two-dimensional map and the three dimensional map.

In this sight, many streets run crisscross and various buildings are arranged thereon as objects. Each building is attached with a suggestive name. For example, "CD SHOP," "VISUAL ARRANGER," and "KARAOKE HOUSE" are specific names of constructions or facilities among various buildings. The basic frameworks (for example, the size of the entire town and the location of each street) other than buildings are stored in the HDD 104 in a predetermined manner. The frameworks are displayed according to this stored information. On the basic frameworks, the buildings indicated by the object index data shown in FIG. 2(*a*) are laid out on the map. For example, the index data 202 is used to display a building having a name indicated by the script data 214, in a shape indicated by the object outline data 213, at a location indicated by the object location data 212. When all the buildings corresponding to the index data parts 202, 203 and so on shown in FIG. 2(*a*) are displayed, the graphic presentation of the virtual sight such as shown in FIGS. 3 and 4 are completed.

According to this music data processing apparatus, the user can trace the map on the display 108 as if walking about in the sight such as shown in FIGS. 3 and 4, and the user can access or address any desired building to perform desired processing on the music data in unique manner to that building. The following describes steps of this music data processing.

Figure 5:
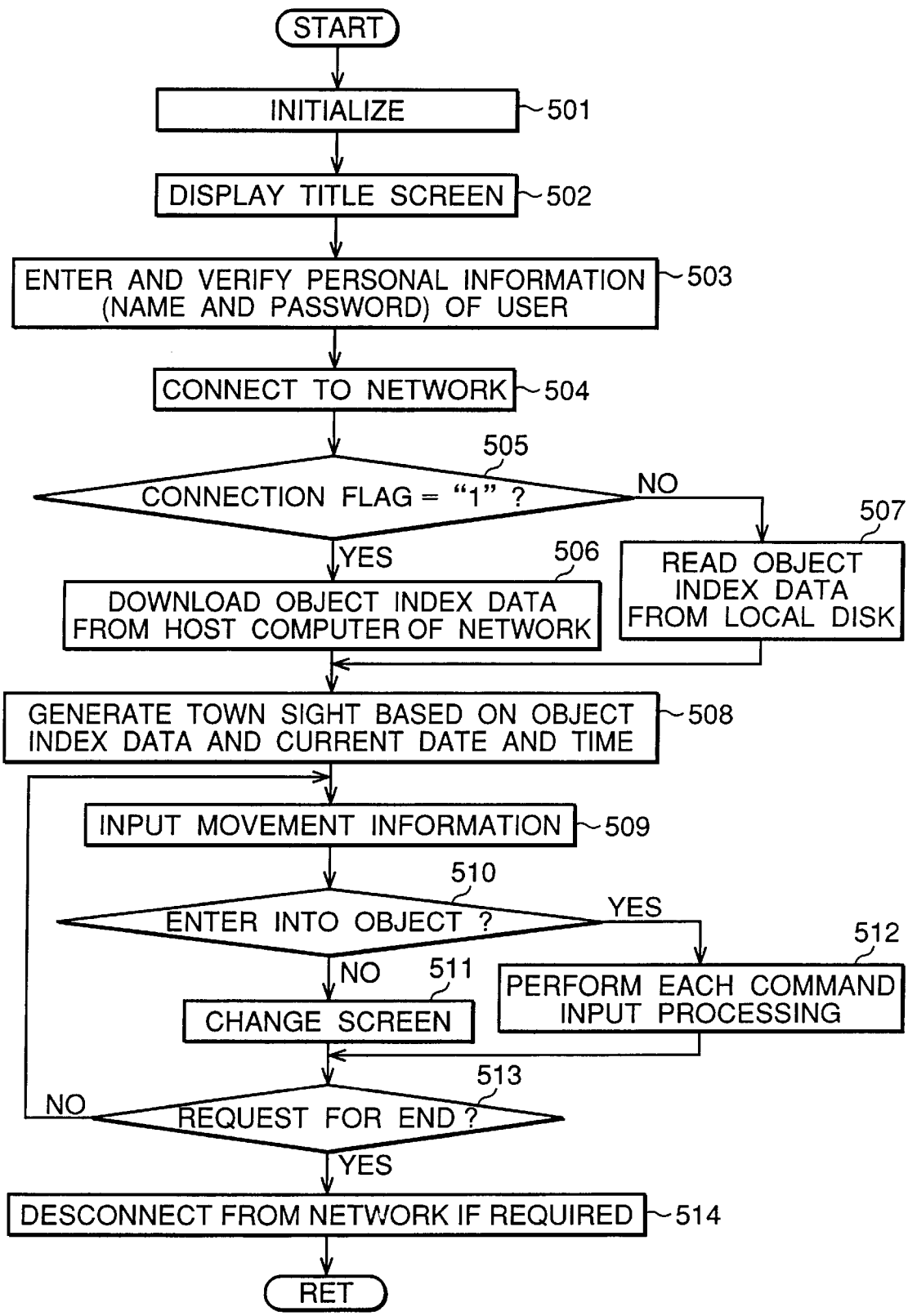
FIG. 5 is a flowchart of overall music data processing.

FIG. 5 is a flowchart of the entire processing to be performed when the music data processing is instructed to start. The music data processing program is stored in the HDD 104 in the music data processing apparatus shown in FIG. 1. First, in step 501, various initializing operations are performed. Next, in step 502, a title screen is displayed. The title screen shows an entrance for example to the virtual town as shown in FIGS. 3 and 4. In step 503, the user enters his or her personal information (name and password for example) for verification. In step 504, network connection processing is performed.

Figure 6:
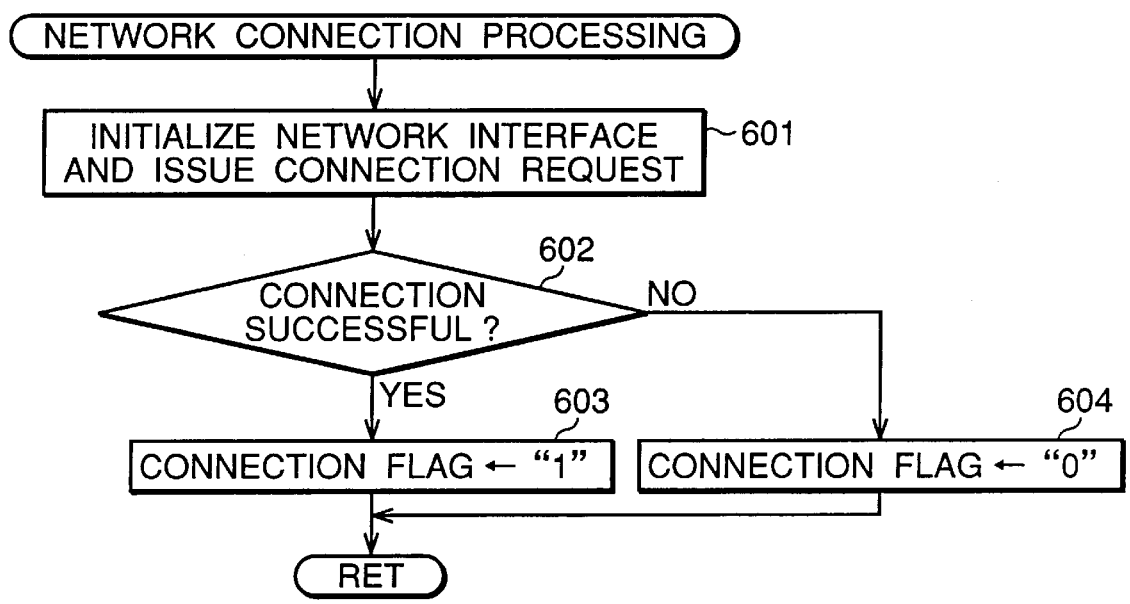
FIG. 6 is a flowchart of network connection processing.

FIG. 6 shows a flowchart of the network connection processing of step 504. In step 601, the network interface (namely, the communication interface 107) is initialized and a request for connection is made. This request for connection is a step for sending the connection request by this user to the network 120 by using the personal information entered in step 503. Next, in step 602, it is determined whether the connection has been successful. If the connection is found successful, then in step 603, a connection flag is set to "1" and control is returned to the music data processing program. If the connection is found unsuccessful in step 602, the connection flag is set to "0" in step 604 and control is returned to the music data processing program.

Referring to FIG. 5 again, it is determined in step 505, after the connection processing of step 504, whether the connection flag is "1". If the connection flag is found "1", the object index data is read from the host computer 121 on the network 120 in step 506. As described with reference to FIG. 2(a), the basic portion of the object index data has already been stored in the HDD 104 from the CD-ROM drive 106. However, when this music data apparatus has been connected to the network 120, the object index data of the most recent or latest version is downloaded from the host computer 121 to update or renew the existing earlier object index data stored in the HDD 104. This allows the processing to be performed with the most recent data every time this music data processing apparatus is connected to the host computer 121 of the network 120. If the connection flag is found not "1" in step 505, then, in step 507, the object index data stored in the HDD 104, a local storage device, is read out. Thus, if this music data processing apparatus is not connected to the host computer 121 of the network 120, the necessary processing can be performed by using the existing data stored in the HDD 104.

When the operations of steps 506 and 507 have been completed, then, in step 508, town sight data is generated according to the object index data stored in the HDD 104 and clock data indicative of current date and time. If this music data processing apparatus is connected to the host computer 121 of the network 120, the most recent object index data may be utilized. The generated town sight data is graphically presented on the display 108 as shown in FIG. 3 Laor FIG. 4. The current date and time are stored in a backup storage device that keeps storing date and time data when this music data processing apparatus is powered off. The town sight data is generated according to the current date and time. For example, the town sight data is varied according to seasons. If it is spring now, a spring-like sight is generated for example. If it is daytime now, a daytime-like sight is generated for example.

Then, in step 509, inputting of movement information is accepted. This is the processing in which, while the town sight such as shown in FIG. 3 or FIG. 4 is displayed, a cursor position during walking along a street or upon entering a desired building is inputted by the manipulation of the input device 105 such as the mouse and is accepted by the apparatus. A command to access a building is issued by clicking the mouse at that building. In step 510, it is determined whether the command for accessing the building has been issued. If this command is found issued, control is passed to step 512; if not, control is passed to step 511. In step 512, the specific processing allotted to the building for which the command to enter has been issued is performed. In step 511, the current screen is replaced by a screen after the movement on the map is performed. After the operations of steps 511 and 512 have been completed, it is determined in step 513 whether a request for ending the processing has been entered. If the request for ending the processing is found entered, this music data processing apparatus is disconnected from the network if required in step 514, upon which the processing comes to an end. If no request for ending the processing is found in step 513, control is returned to step 509 and this music data processing apparatus waits for an input operation by the user.

As described above, the inventive music data processing apparatus is provided with a local storage such as the HDD 104 for locally stocking first information including music data and various application programs which are selectively executed to treat the music data. The interface means in the form of the communication interface 107 is used for communicating with the network 120 having a remote storage which remotely stores second information including music data and various application programs which are made available latest by the network 120. Check means is prepared in the form of the connection flag for detecting whether or not the interface means is allowed to communicate with the network 120. Control means implemented by the CPU 101 operates when the check means detects that the interface means communicates with the network 120 for downloading the second information from the remote storage of the network 120 and for storing the downloaded second information in the local storage so as to supplement or update the first information stocked in the local storage. Processor means is also implemented by the CPU 101 for selectively executing the various application programs to treat the music data based on the second information when the second information is downloaded and otherwise for selectively executing the various application programs to treat the music data based on the first information when the second information is not downloaded. The music data processing apparatus is further provided with display means in the form of the display 108 for displaying an image of a virtual town map containing various objects corresponding to the various application programs. Operation means in the form of the input device 105 is manipulated for designating one of the various objects so as to select one of the various application programs corresponding to the designated object so that the mprocessor means executes the selected one of the various application programs.

Figure 9:
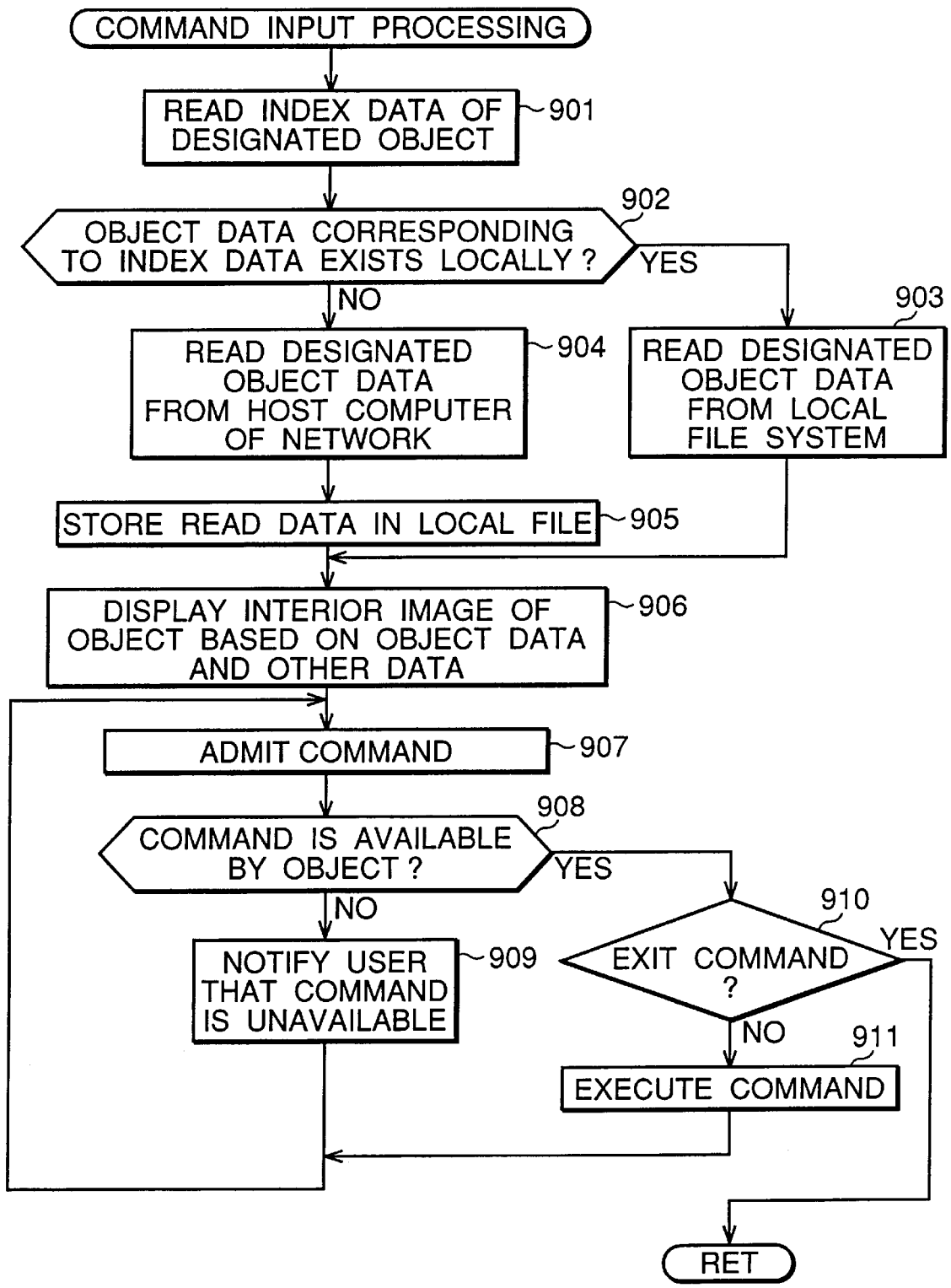
FIG. 9 is a flowchart of command input processing.

FIG. 9 shows a flowchart of procedure for the command input processing of step 512. Each building has the command input processing unique thereto, so that different buildings have different command input processing operations. FIG. 9 describes a flow of common steps of the command input processing operations. First, in step 901, the index data part corresponding to the building for which access has been designated is read from the object index data shown in FIG. 2(a). Here, it is assumed that the data 202 shown in FIG. 2(a) has been read out. Next, in step 902, it is determined whether the object content data shown in FIG. 2(b) corresponding to that index data part 202 is stored in the HDD 104 as a local file system. If the object content data is found stored, the same is read from the HDD 104 in step 903 and control is passed to step 906. If not, the designated object content data is read from the host computer 121 on the network 120 in step 904. In step 905, the obtained object content data is stored in the HDD 104 and control is passed to step 906.

In step 906, an interior image of the building is displayed based on the object content data read from the HDD 104 in step 903 or downloaded from the host computer 121 in step 904, and further based on other data such as especially the object interior image data 225 of the object content data shown in FIG. 2(b). For example, if the building accessed by the user is a CD-ROM shop denoted by "CD SHOP" in FIG. 3 or FIG. 4, an image is displayed in which CD-ROMs are laid out on shelves with jackets or backs of CD-ROMs toward the user.

Next, in step 907, a command entered by the user from the input device 105 is admitted. In step 908, it is determined whether the entered command is valid in that building. The command valid in each building is specified by the item 226 of the object content data as described with reference to FIG. 2(b). If the entered command is found valid in that building, control is passed to step 910. In step 910, it is determined whether the entered command is an EXIT command that indicates exiting that building. If the command is found the EXIT command, the command input processing is ended and the processing is returned. If the entered command is found not the EXIT command, the application program corresponding to the entered command is performed in step 911. Since the application program is stored in the item 226 of the object content data shown in FIG. 2(b), the application program is read therefrom for execution. When the operation of step 911 has been completed, control is returned to step 907. If the command entered in step 908 is found not valid in that building, error message is sent to the user and control is returned to step 907.

Figure 10:
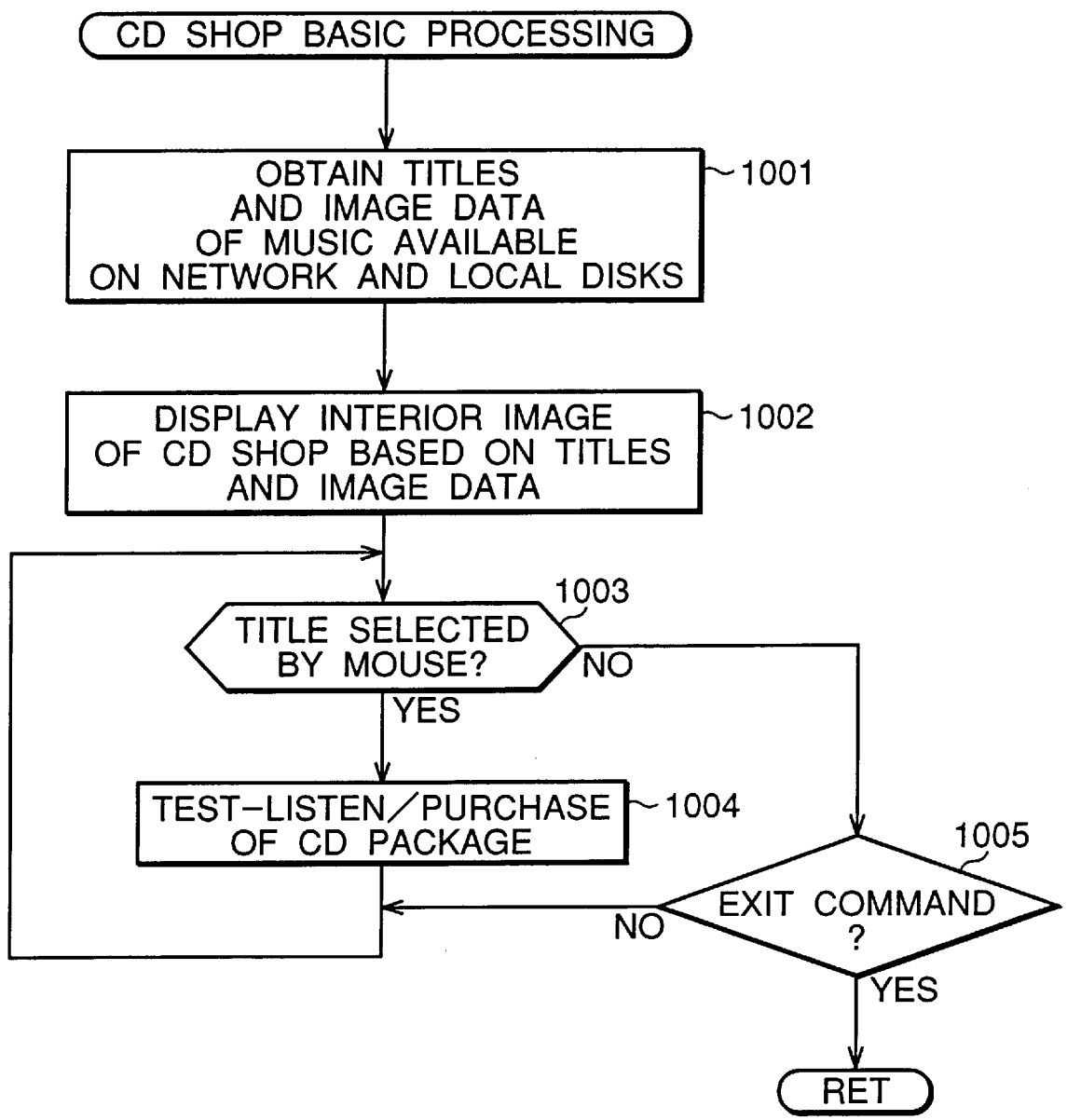
FIG. 10 is a flowchart of download processing to be performed when the user enters a CD shop.

The following describes the processing to be performed when the user has entered the CD-ROM shop for one example in the command input processing. In this case, the command input processing is performed basically according to the procedure shown in FIG. 9. Described below is the processing to be performed especially when the user has entered the CD-ROM shop. FIG. 10 is a flowchart of steps 906 through 911 shown in FIG. 9 of the command input processing to be performed when the user has entered the CD-ROM shop. For the processing to be performed when the user has entered the CD-ROM shop, steps 906 through 911 shown in FIG. 9 may be replaced by the steps of FIG. 10.

In the processing shown in FIG. 10, the title and music data of a music pieces available on the network and the local disk is obtained in step 1001. The local disks in HDD 104 and CD-ROM drive 106 store the music data (performance data) of available pieces of music and auxiliary data such as titles and image data. The necessary pieces of data are obtained. If this music data processing apparatus is connected to the network 120, the necessary pieces of data are downloaded from the host computer 121. Next, in step 1002, based on the obtained title and image data, the interior image of the CD-ROM shop is displayed. As a result, the image is displayed in which pieces of music available on the network and local disks are laid out on shelves in an image of CD packages for example.

In step 1003, an operation performed by the user is detected. It is determined whether a title label on the CD package image has been clicked with the mouse. If the title is clicked, it is assumed that the user intends to try listening or to purchase the CD package of that title. Then, in step 1004, the listening/purchase processing is performed, after which control is returned to step 1003. In step 1003, if the title is not clicked, then, in step 1005, it is determined whether an EXIT command has been entered. If the EXIT command is entered, the processing is returned. If not, control is returned to step 1003.

Figure 11:
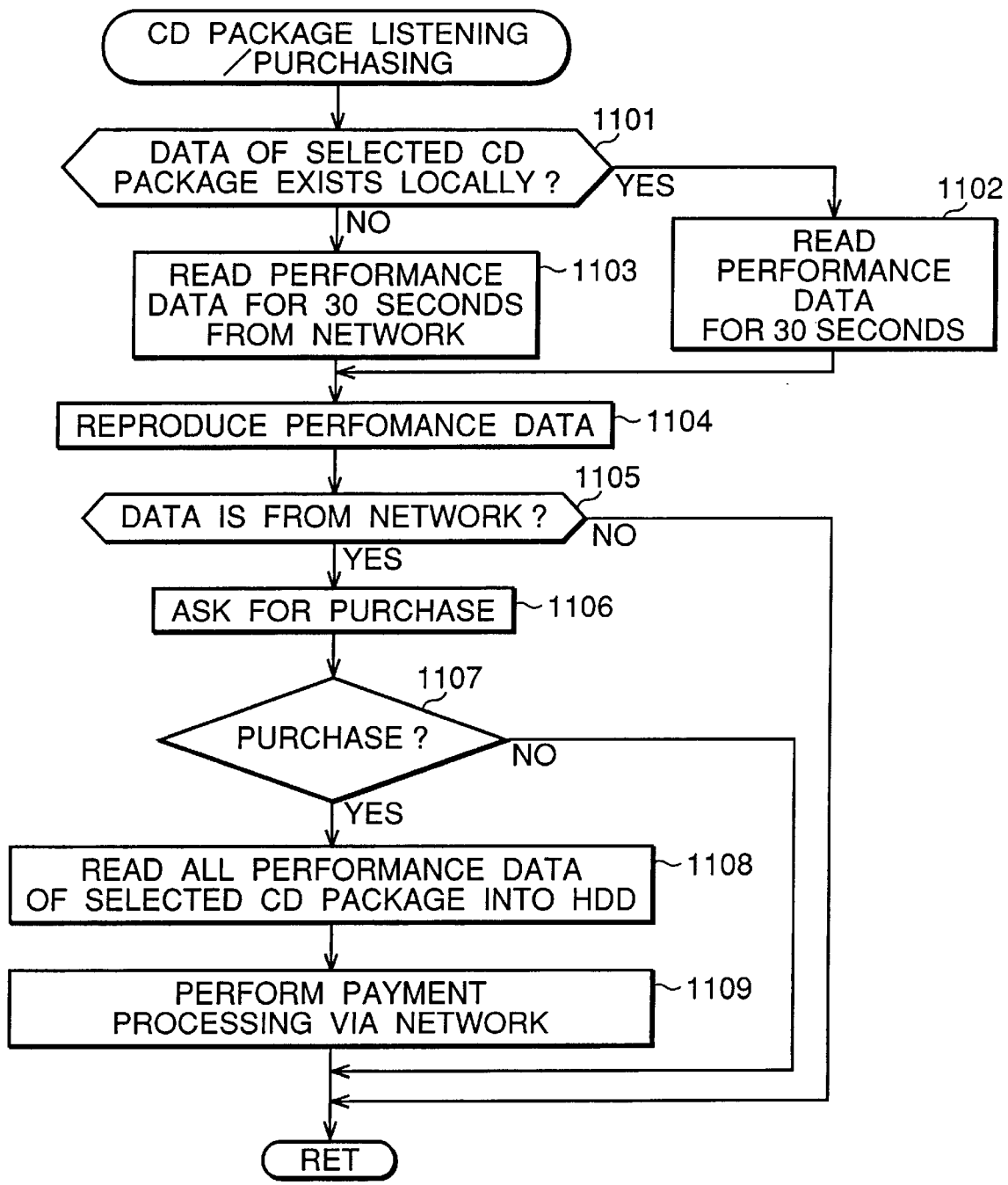
FIG. 11 is a flowchart of CD listening/purchase processing.

FIG. 11 shows a procedure of the CD listening/purchase routine of step 1004 shown in FIG. 10. In the CD listening/ purchase processing, it is first determined in step 1101 whether the performance data corresponding to the title selected by mouse click is stored in the local disk. To be more specific, the HDD 104 and the CD-ROM drive 106 are searched for the performance data. If the performance data is found locally, then, in step 1102, the performance data is read out partially for 30 seconds for example from that local file, and control is passed to step 1104. If the performance data is not found locally in step 1101, then, in step 1103, the performance data for 30 seconds is downloaded from the host computer 121 of the network 120 and control is passed to step 1104.

In step 1104, the performance data for 30 seconds read in step 1102 or step 1103 is reproduced. This reproduction is performed by sending the performance data to a sound source and a sound system connected to this music data processing apparatus via the MIDI interface 109. Next, in step 1105, it is determined whether the performance data has been downloaded from the network 120. If the performance data is found not downloaded from the network 120, it indicates that the performance data already exists locally. Namely, the performance data has already been purchased, so that the processing returns without doing anything. A message indicating that the performance data has already been purchased may be displayed if required. If the performance data is found downloaded from the network 120 in step 1105, a message for inquiring the user as to whether that performance data is to be purchased is displayed in step 1106. In step 1107, it is determined whether the user has performed an operation for indicating purchase. If the user has indicated purchase, the whole of the performance data of the selected title is downloaded to the local disk in HDD 104 in step 1108. Then, in step 1109, payment processing is performed via the network 120 and the CD listening/ purchase processing returns. If the user has aborted the purchase in step 1107, the listening/purchase processing returns without doing anything.

The performance data purchased in the CD-ROM shop is collected in the local file system of the HDD 104 as described above, allowing the user to treat the collected performance data without restriction. For example, the user can enter a building having an audition room in the virtual town shown in FIG. 3 or FIG. 4 to reproduce the purchased performance data, or enter a building having an arrangement room to edit the purchased performance data, or enter a music gym to practice the piece of music of the purchased performance data.

Figure 7:
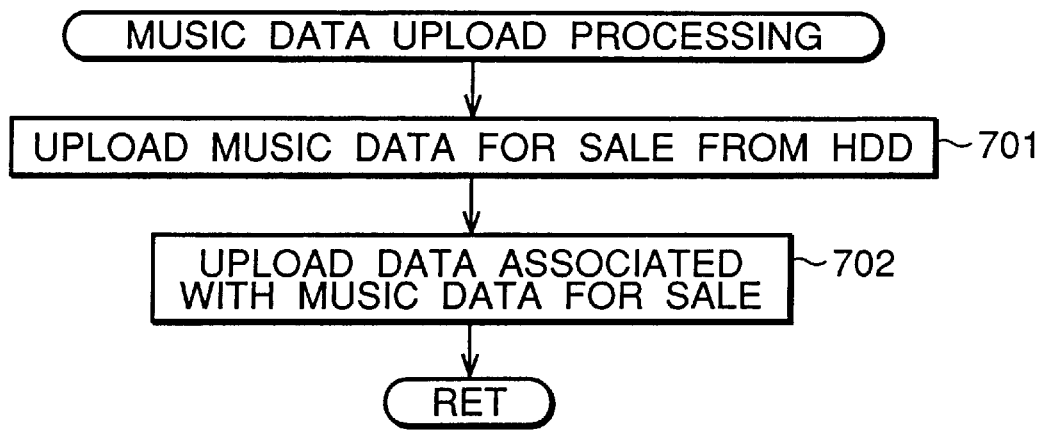
FIG. 7 is a flowchart of music data upload processing.

The following describes the processing to be performed when the user has entered a production house as another example of the command input processing. In this example, the command input processing is performed basically according to the procedure shown in FIG. 9. In what follows, the processing to be performed when the user has entered the production house will be described especially. In the production house, the user can distribute or sell performance data produced or created by the user. FIG. 7 shows a procedure of selling the performance data created by the user to the production house. This is a flowchart of step 911 shown in FIG. 9. When the user enters the production house, an interior image of the production house is displayed according to the procedure of steps 901 through 906. When a command entering a room for accepting the selling proposal in the production house is inputted (steps 907, 908, and 910), the processing shown in FIG. 7 is performed as the execution processing (step 911) for that command.

In the processing shown in FIG. 7, the user first uploads the performance data for sale or distribution from the HDD 104 to the host computer 121 of the network 120 in step 701. Next, in step 702, the user likewise uploads the data associated with the performance data, and the processing returns. The associated data includes personal information of the creator of the performance data, terms of sale, and description of the performance data.

Figure 8:
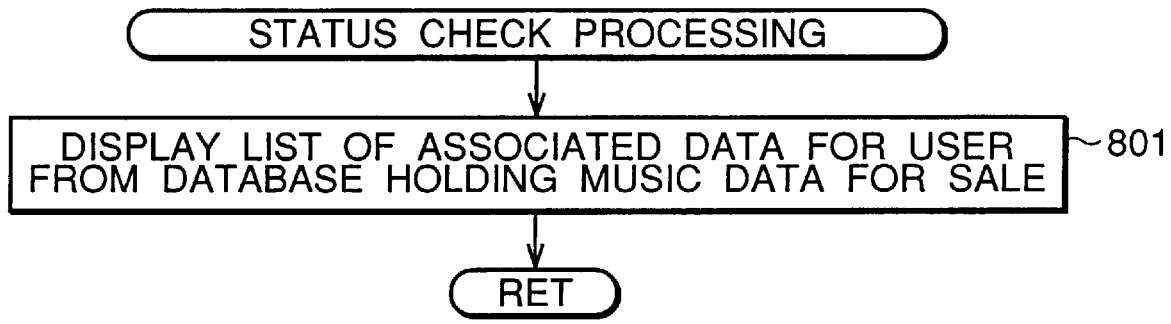
FIG. 8 is a flowchart of status check processing.

The performance data brought by the user to the production house is individually determined by the host computer 121 as to whether the performance data is to be bought. The user can check whether the selling of the performance data has been successful in a spesific room in the production house. FIG. 8 shows a procedure of checking by the user whether the performance data has been bought by the production house. FIG. 8 is a flowchart of step 911 shown in FIG. 9. When the user enters the room of checking whether the performance data has been bought by the production house, the processing shown in FIG. 8 is performed.

In the processing shown in FIG. 8, a list of data associated with the user is displayed from a database holding the information about the performance data being sold in step 801. Then, the processing returns. This allows the user to check whether the performance data brought to the production house has been bought by the same. If the performance data has been bought by the production house, that fact is displayed. Based on the personal data, processing of payment of licensing is separately conducted. The performance data bought by the production house is laid out in the CD-ROM shop for demos-listening/purchasing by other users.

In step 505 shown in FIG. 5, only the object index data is read from the host computer 121. It will be apparent that the object content data may also be read from the host computer 121 to the HDD 104. The object index data and the object content data are locally read from the HDD 104. It will be apparent that, in addition to the HDD 104, these pieces of data may be read from the CD-ROM drive 106.

The invention covers a machine readable medium in the form of a CD-ROM or else for use in the terminal apparatus including the CPU 101. The terminal apparatus is connectable to a host station and is responsive to a command to execute an application program to treat music data. The medium contains instructions executable by the CPU 101 for causing the terminal apparatus to perform the steps of locally storing in a local storage an old version of software containing music data and various application programs which are selectively executed to treat the music data, optionally activating an interface prior to execution of the application program for communication with the host station having a remote storage which remotely stores a new version of software including music data and various application programs which are made available latest by the host station, operating the CPU when the interface establishes the communication with the host station for downloading the new version from the remote storage of the host station and for transferring the downloaded new version to the local storage so as to renew the old version stocked in the local storage by the new version, and operating the CPU in response to the command for selectively executing the various application programs to treat the music data based on the new version when the interface has been activated and otherwise for selectively executing the various application programs to treat the music data based on the old version when the interface has not been activated.

Further, the inventive machine readable medium contains program instructions executable by the CPU for causing the terminal apparatus to perform the steps of controlling a local storage for locally storing the music contents, producing an item of the music contents which is stored in the local storage for later distribution, reproducing the music contents stored in the local storage, activating an interface for communicating with the host station having a remote storage which remotely stores the music contents for distribution, uploading the produced item of the music contents from the local storage to the remote storage through the interface for distributing the produced item of the music contents, and downloading another item of the music contents from the remote storage to the local storage through the interface for collecting the music contents.

Moreover, the inventive machine readable medium contains program instructions executable by the CPU for causing the multimedia apparatus to perform the steps of storing music information and picture information in a storage, graphically presenting on a display a map of a virtual town according to the picture information stored in the storage, the map containing a plurality of sites which are linked to provide a plurality of services associated to the music information stored in the storage, manipulating a pointing tool for tracing the map on the display to address a site so as to specify a service allotted to the addressed site, and operating the CPU when the site is addressed by the pointing tool for processing the music information stored in the storage so as to provide the specified service.

As described and according to the invention, music data and various programs for processing this music data are distributed to a local file system and a network. When this music data processing apparatus is connected to the network, the available music data and associated programs can be downloaded for execution. The contents of the available music data and associated programs may be changed dependently on the connection modes of this music data processing apparatus. That is, if this music data processing apparatus is connected to the network, the processing can be performed by using the most recent music data and associated programs. If this music data processing apparatus is not connected to the network, regular processing can be performed by using the music data and associated programs stored in the local file system. Adding and/or updating data and programs on the network side allows easy addition of new capabilities and easy upgrading of existing capabilities without making the user aware thereof. For example, if a music lesson program is implemented on the network, a certain amount of music data and associated programs are stored in the local file system for beginning basic level lessons. For higher-level lessons, advanced music data and associated programs are downloaded from the network. In this case, the user need not be aware how the data and the associated programs are distributed between the network and the local file system. Moreover, according to the invention, a sight of a town arranged with buildings is displayed. In the displayed sight, the user can move around to access desired buildings. In each accessed building, the music data processing unique thereto is performed, allowing the user to have easy and enjoyable musical experiences.

While the preferred embodiments of the present invention have been described using specific terms, such description is for illustrative purposes only, and it is to be understood that changes and variations may be made without departing from the spirit or scope of the appended claims.

What is claimed is:

1. A music data processing apparatus comprising:
   a local storage provided for locally stocking first information including music data and various application programs which are selectively executed to treat the music data;

interface means used for communicating with a network having a remote storage which remotely stores second information including music data and various application programs which are made available latest by the network;

check means for detecting whether or not the interface means is allowed to communicate with the network;

control means operative when the check means detects that the interface means communicates with the network for downloading the second information from the remote storage of the network and for storing the downloaded second information in the local storage so as to supplement or update the first information stocked in the local storage; and processor means for selectively executing the various application programs to treat the music data based on the second information when the second information is downloaded and otherwise for selectively executing the various application programs to treat the music data based on the first information when the second information is not downloaded.

2. A music data processing apparatus according to claim 1, further comprising display means for displaying an image of a virtual town map containing various objects corresponding to the various application programs, and operation means manipulated for designating one of the various objects so as to select one of the various application programs corresponding to the designated object so that the processor means executes the selected one of the various application programs.

3. A terminal apparatus connectable to a host station and responsive to a command to execute an application program to treat music data, the terminal apparatus comprising:

a local storage that locally stores an old version of software containing music data and various application programs which are selectively executed to treat the music data;

an interface that is optionally activated prior to execution of an application program for communication with the host station having a remote storage which remotely stores a new version of software including music data and various application programs which are made available latest by the host station;

a controller that operates when the interface establishes the communication with the host station for downloading the new version from the remote storage of the host station and for transferring the downloaded new version to the local storage so as to renew the old version stocked in the local storage by the new version; and a processor that responds to the command for selectively executing the various application programs to treat the music data based on the new version when the interface has been activated and otherwise for selectively executing the various application programs to treat the music data based on the old version when the interface has not been activated.

4. A terminal apparatus according to claim 3, further comprising a display that graphically presents a map containing various objects corresponding to the various application programs, and a pointing tool that is manipulated for pointing one of the various objects on the display so as to select one of the various application programs corresponding to the pointed object to thereby input the command.

5. A terminal apparatus connectable to a host station for transacting music contents, the terminal apparatus comprising:

a local storage that is provided for locally storing the music contents;

a production section that is operated to produce an item of the music contents which is stored in the local storage for later distribution;

a reproduction section that is operated to reproduce the music contents stored in the local storage;

an interface that is activated for communicating with the host station having a remote storage which remotely stores the music contents for distribution;

an uploader that uploads the produced item of the music contents from the local storage to the remote storage through the interface for distributing the produced item of the music contents; and a downloaded that downloads another item of the music contents from the remote storage to the local storage through the interface for collecting the music contents.

6. A terminal apparatus according to claim 5, wherein the interface comprises a graphic user interface including a display for graphically presenting a virtual shop so that the uploader and the downloaded transact the music contents through the virtual shop.

7. A multimedia apparatus comprising:

a storage that stores music information and picture information;

a display that graphically presents a map of a virtual town according to the picture information stored in the storage, the map containing a plurality of sites which are linked to provide a plurality of services associated to the music information stored in the storage;

a pointing tool that is manipulated for tracing the map on the display to address a site so as to specify a service allotted to the addressed site, and a processor that operates when the site is addressed by the pointing tool for processing the music information stored in the storage so as to provide the specified service.

8. A multimedia apparatus according to claim 7, further comprising an interface that is activated for communicating with a host station having a remote storage which remotely stores a new version of the music information and the picture information, which are made available latest by the host station, and a controller that operates when the interface communicates with the host station for downloading the new version from the remote storage of the host station and for transferring the downloaded new version to the storage so as to renew an old version of the music information and the picture information stored in the storage by the new version.

9. A method of operating a terminal apparatus which is connectable to a host station and which is responsive to a command to execute an application program to treat music data, the method comprising the steps of:

locally storing in a local storage an old version of software containing music data and various application programs which are selectively executed to treat the music data;

optionally activating an interface prior to execution of an application program for communication with the host station having a remote storage which remotely stores a new version of software including music data and various application programs which are made available latest by the host station;

operating a controller when the interface establishes the communication with the host station for downloading the new version from the remote storage of the host station and for transferring the downloaded new version to the local storage so as to renew the old version stocked in the local storage by the new version; and operating a processor in response to the command for selectively executing the various application programs to treat the music data based on the new version when the interface has been activated and otherwise for selectively executing the various application programs to treat the music data based on the old version when the interface has not been activated.

10. A method according to claim 9, further comprising the steps of graphically presenting on a display a map containing various objects corresponding to the various application programs, and manipulating a pointing tool for pointing one of the various objects on the display so as to select one of the various application programs corresponding to the pointed object to thereby input the command.

11. A method of operating a terminal apparatus, wherein the terminal apparatus has a local storage for locally storing music contents which is connectable to a host station for transacting music contents, the method comprising the steps of:

producing an item of music contents which is stored in the local storage for later distribution;

reproducing the music contents stored in the local storage;

activating an interface for communicating with the host station having a remote storage which remotely store the music contents for distribution;

uploading the produced item of the music contents from the local storage to the remote storage through the interface for distributing the produced item of the music contents; and downloading another item of the music contents from the remote storage to the local storage through the interface for collecting the music contents.

12. A method according to claim 11, wherein the step of activating comprises activating the interface composed of a graphic user interface including a display for graphically presenting a virtual shop so that the music contents are treated by the virtual shop during the uploading and downloading of the music contents.

13. A method of operating a multimedia apparatus comprising the steps of:

storing music information and picture information in a storage;

graphically presenting on a display a map of a virtual town according to the picture information stored in the storage, the map containing a plurality of sites which are linked to provide a plurality of services associated to the music information stored in the storage;

manipulating a pointing tool for tracing the map on the display to address a site so as to specify a service allotted to the addressed site, and operating a processor when the site is addressed by the pointing tool for processing the music information stored in the storage so as to provide the specified service.

14. A method according to claim 13, further comprising the steps of activating an interface for communicating with a host station having a remote storage which remotely stores a new version of the music information and the picture information, which are made available latest by the host station, and operating a controller when the interface communicates with the host station for downloading the new version from the remote storage of the host station and for transferring the downloaded new version to the storage so as to renew an old version of the music information and the picture information stored in the storage by the new version.

15. A machine readable medium for use in a terminal apparatus including a CPU, the terminal apparatus being connectable to a host station and being responsive to a command to execute an application program to treat music data, said medium containing instructions executable by the CPU for causing the terminal apparatus to perform the steps of:

locally storing in a local storage an old version of software containing music data and various application programs which are selectively executed to treat the music data;

optionally activating an interface prior to execution of the application program for communication with the host station having a remote storage which remotely stores a new version of software including music data and various application programs which are made available latest by the host station;

operating the CPU when the interface establishes the communication with the host station for downloading the new version from the remote storage of the host station and for transferring the downloaded new version to the local storage so as to renew the old version stocked in the local storage by the new version; and operating the CPU in response to the command for selectively executing the various application programs to treat the music data based on the new version when the interface has been activated and otherwise for selectively executing the various application programs to treat the music data based on the old version when the interface has not been activated.

16. A machine readable medium according to claim 15, further containing instructions for causing the terminal apparatus to perform the steps of graphically presenting on a display a map containing various objects corresponding to the various application programs, and enabling a pointing tool for pointing one of the various objects on the display so as to select one of the various application programs corresponding to the pointed object to thereby input the command.

17. A machine readable medium for use in a terminal apparatus including a CPU, the terminal apparatus being connectable to a host station for transacting music contents, the machine readable medium containing program instructions executable by the CPU for causing the terminal apparatus to perform the steps of:

controlling a local storage for locally storing the music contents;

producing an item of the music contents which is stored in the local storage for later distribution;

reproducing the music contents stored in the local storage;

activating an interface for communicating with the host station having a remote storage which remotely stores the music contents for distribution;

uploading the produced item of the music contents from the local storage to the remote storage through the interface for distributing the produced item of the music contents; and downloading another item of the music contents from the remote storage to the local storage through the interface for collecting the music contents.

18. A machine readable medium according to claim 17, wherein the step of activating comprises activating the interface composed of a graphic user interface including a display for graphically presenting a virtual shop so that the music contents are treated by the virtual shop during the uploading and downloading of the music contents.

19. A machine readable medium for use in a multimedia apparatus including a CPU, the medium containing program instructions executable by the CPU for causing the multimedia apparatus to perform the steps of:

storing music information and picture information in a storage;

graphically presenting on a display a map of a virtual town according to the picture information stored in the storage, the map containing a plurality of sites which are linked to provide a plurality of services associated to the music information stored in the storage;

enabling a pointing tool for tracing the map on the display to address a site so as to specify a service allotted to the addressed site, and operating the CPU when the site is addressed by the pointing tool for processing the music information stored in the storage so as to provide the specified service.

20. A machine readable medium according to claim 19, further containing program instructions for causing the multimedia apparatus to perform the steps of activating an interface for communicating with a host station having a remote storage which remotely stores a new version of the music information and the picture information, which are made available latest by the host station, and operating the CPU when the interface communicates with the host station for downloading the new version from the remote storage of the host station and for transferring the downloaded new version to the storage so as to renew an old version of the music information and the picture information stored in the storage by the new version.

* * * * *